Figure 1:
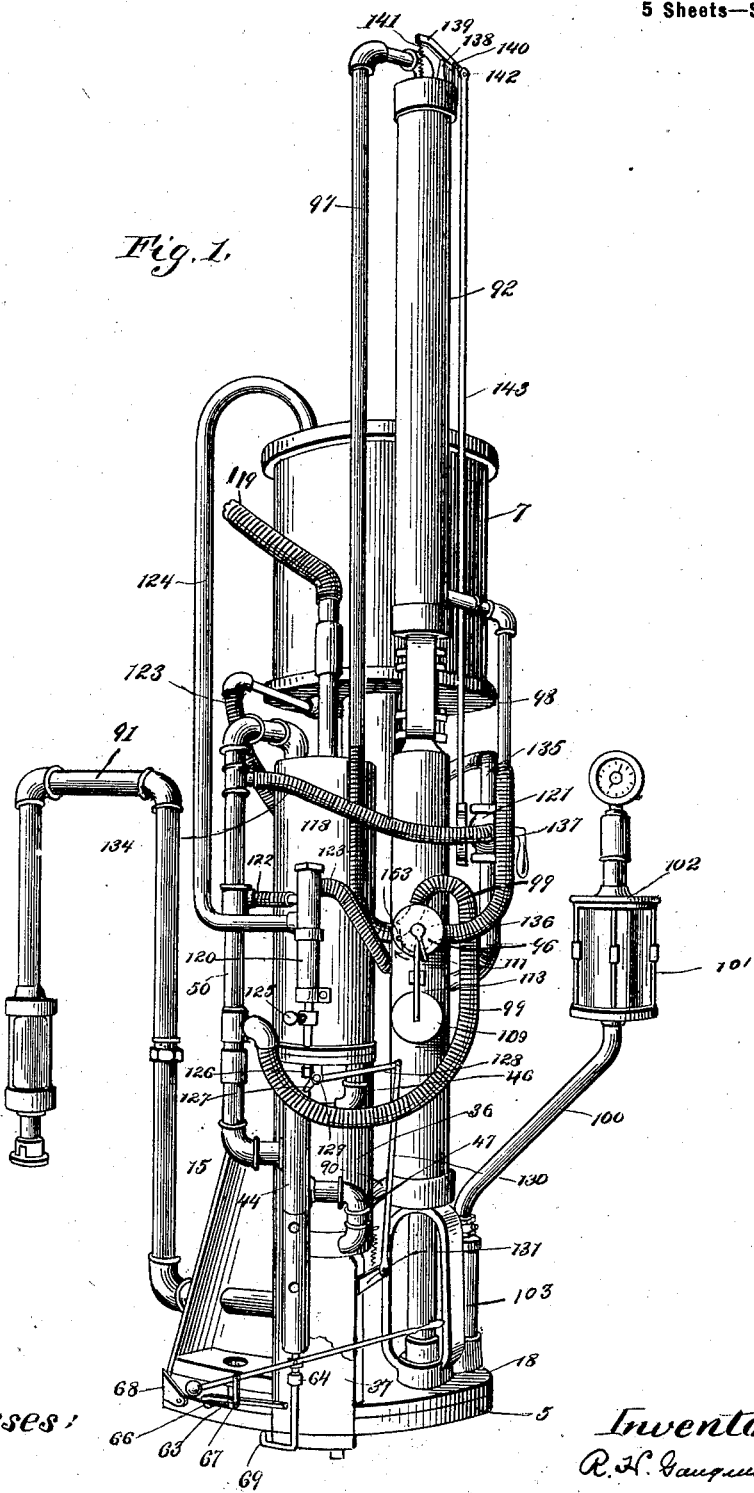

No. 647,298. Patented Apr. 10, 1900.
R. H. GANGWISCH.
APPARATUS FOR RACKING BEER.
(Application filed Oct. 16, 1895. Renewed Mar. 14, 1900.)

(No Model.) 5 Sheets—Sheet 1.

Witnesses:
W. H. Timmermann
Alex. Scott

Inventor:
R. H. Gangwisch
By Henry C. Evert
Atty

THE NORRIS PETERS CO., PHOTO-LITHO., WASHINGTON, D. C.

No. 647,298. Patented Apr. 10, 1900.
R. H. GANGWISCH.
APPARATUS FOR RACKING BEER.
(Application filed Oct. 16, 1895. Renewed Mar. 14, 1900.)
(No Model.) 5 Sheets—Sheet 2.
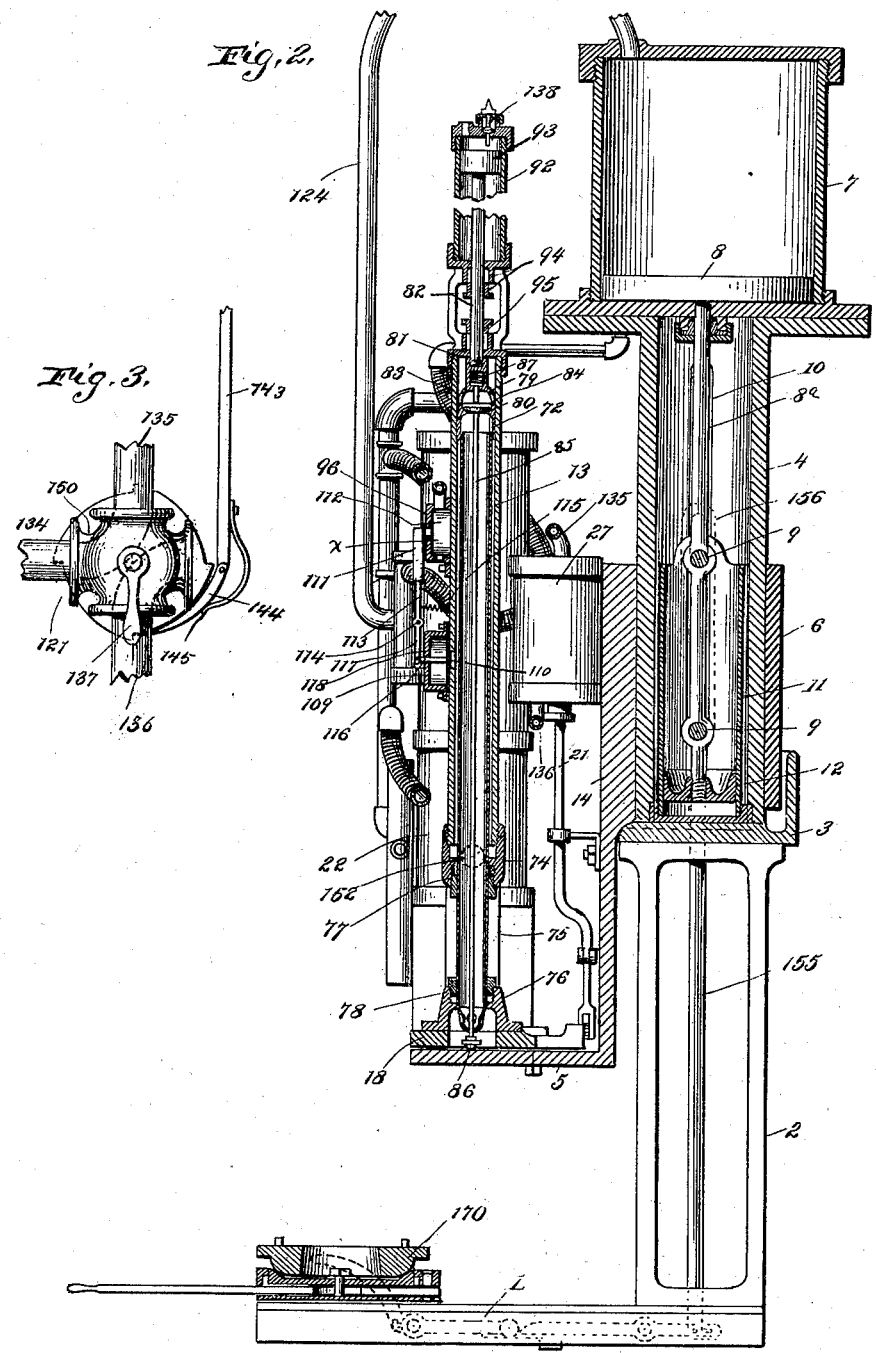
Witnesses:
Inventor:
R. H. Gangwisch
By Henry C. Evert
atty No. 647,298. Patented Apr. 10, 1900.
R. H. GANGWISCH.
APPARATUS FOR RACKING BEER.
(Application filed Oct. 16, 1895. Renewed Mar. 14, 1900.)
(No Model.) 5 Sheets—Sheet 3.
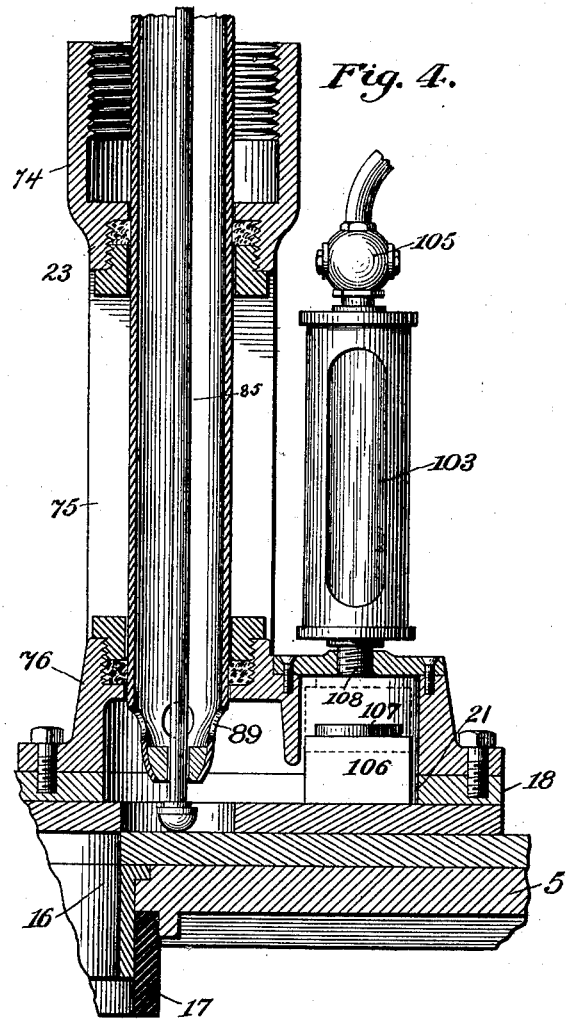
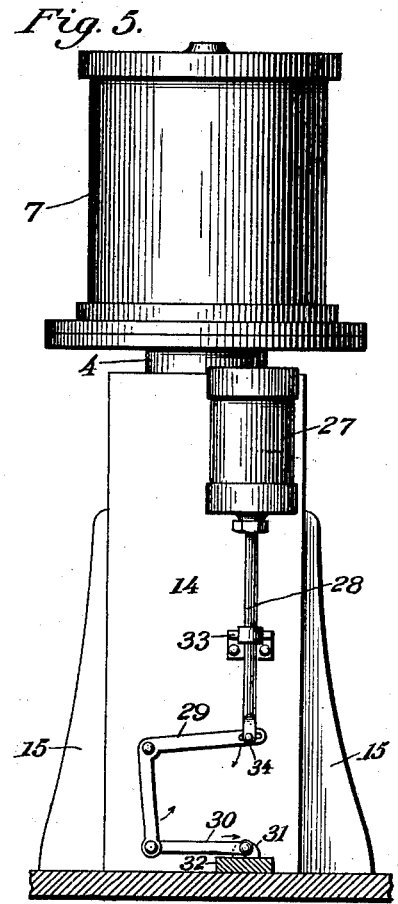
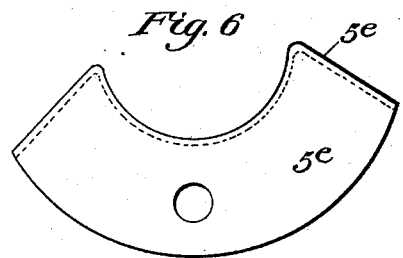
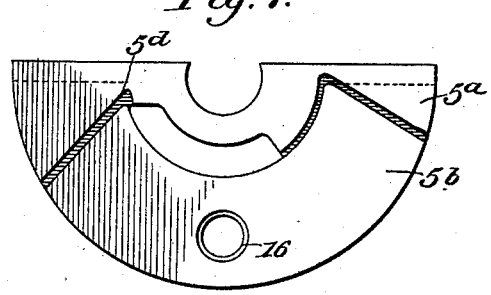
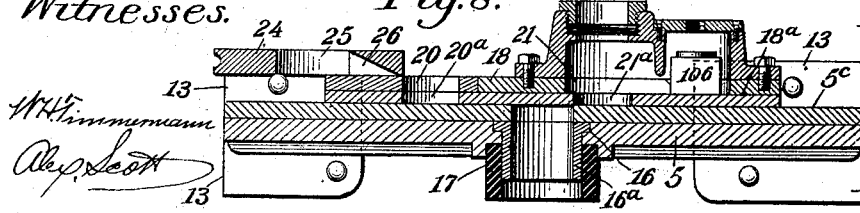
Witnesses. Inventor.
R. H. Gangwisch,
By Henry C. Evert
Atty

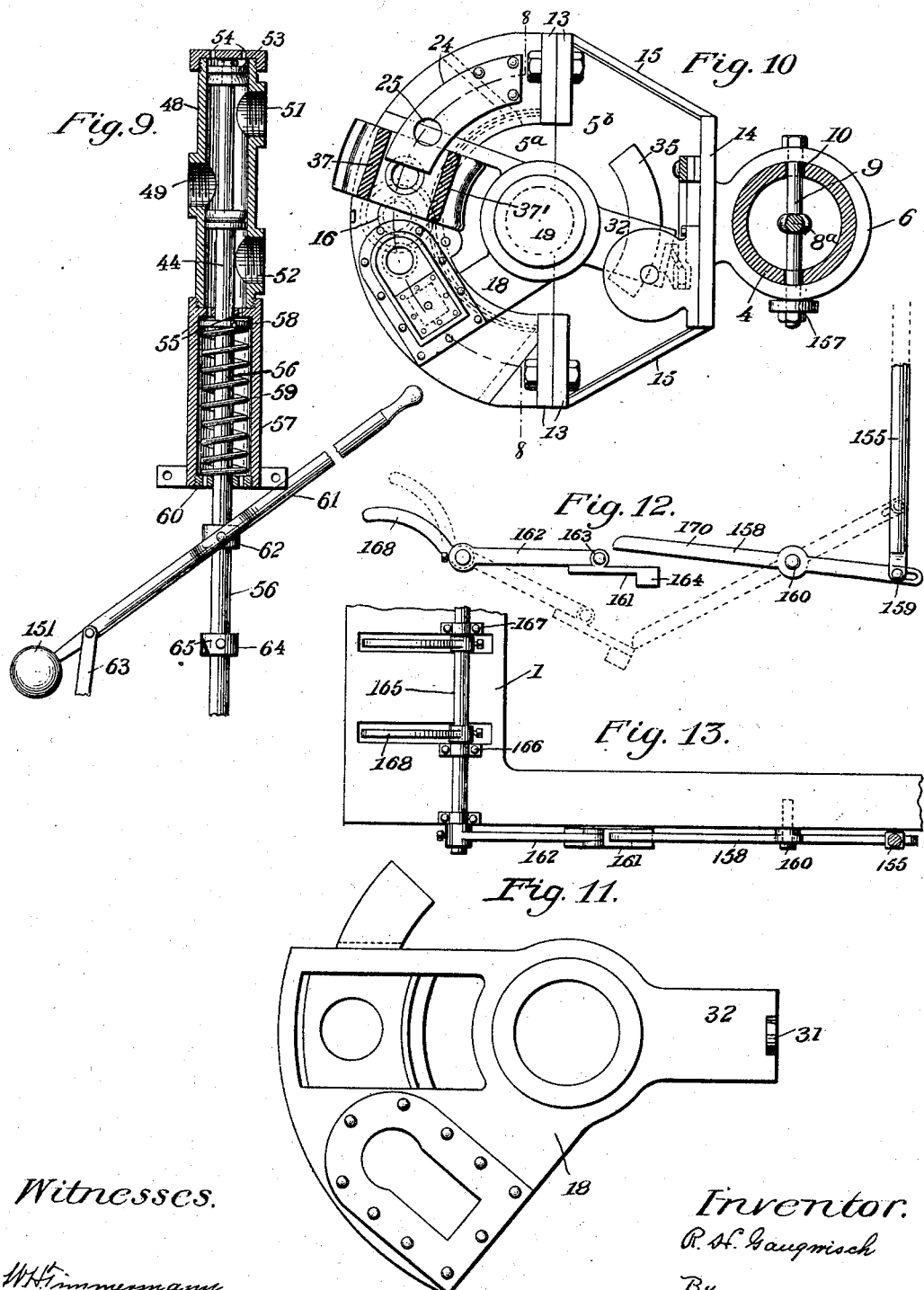

No. 647,298. Patented Apr. 10, 1900.
R. H. GANGWISCH.
APPARATUS FOR RACKING BEER.
(Application filed Oct. 16, 1895. Renewed Mar. 14, 1900.)
(No Model.) 5 Sheets—Sheet 5.
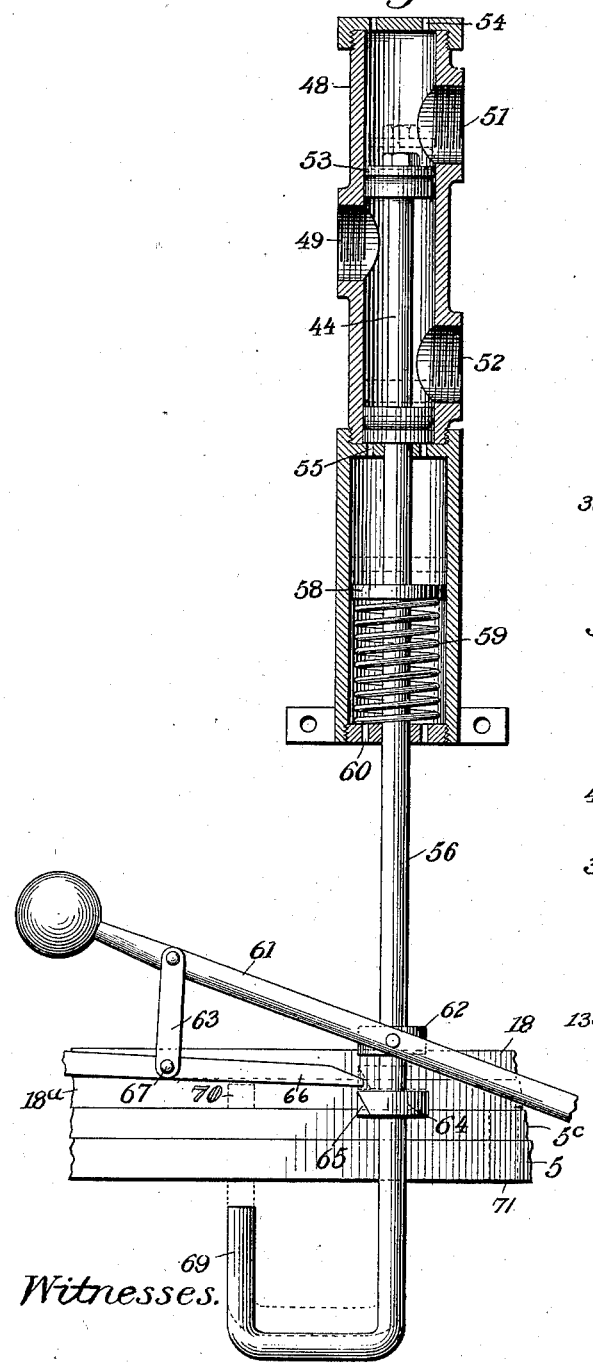
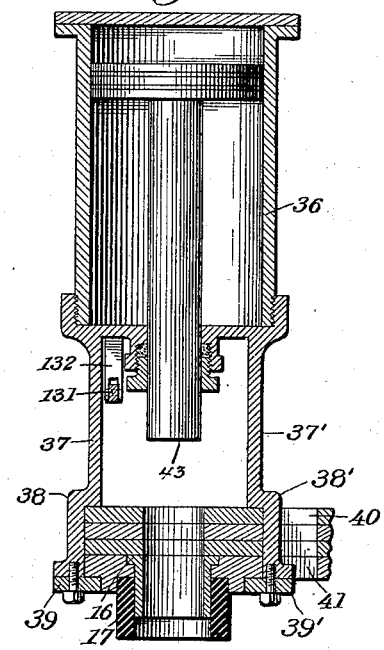
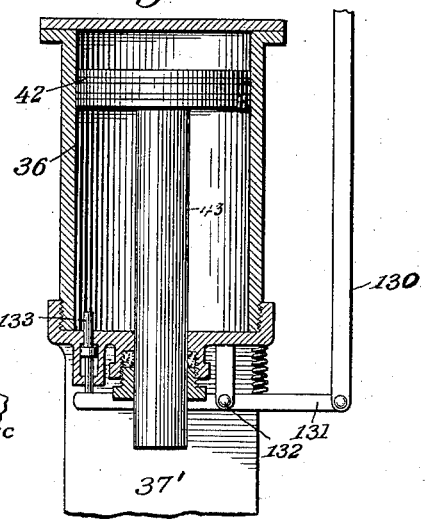
Witnesses.
Inventor.
R. H. Gangwisch
By Henry C Evert
atty.

UNITED STATES PATENT OFFICE.

RICHARD H. GANGWISCH, OF PITTSBURG, PENNSYLVANIA.

APPARATUS FOR RACKING BEER.

SPECIFICATION forming part of Letters Patent No. 647,298, dated April 10, 1900.

Application filed October 16, 1895. Renewed March 14, 1900. Serial No. 8,673. (No model.)

*To all whom it may concern:*

Be it known that I, RICHARD H. GANGWISCH, a citizen of the United States of America, residing at Pittsburg, in the county of Allegheny and State of Pennsylvania, have invented certain new and useful Improvements in Apparatus for Racking Beer, of which the following is a specification, reference being had to the accompanying drawings.

This invention relates to certain new and useful improvements in an apparatus for racking carbonated liquids without relieving the pressure, and it may be more particularly referred to as a hermetic apparatus for this purpose.

The invention has for one object the provision of new and novel means for preventing the escape of the carbonic-acid gas contained in the liquid and preventing it from becoming flat; furthermore, the construction of a device that will prevent any overflow or waste of the liquid being racked.

A further object of the invention is the construction of a device of the above-referred-to class whereby the receptacles may be placed rapidly in position, filled, and removed and whereby the bungs are automatically inserted in the receptacles to be filled without reducing the pressure.

A further object of the invention is the construction of an apparatus for the above-described purpose that will fill the receptacle with air or gas at a greater pressure than atmospheric pressure and replace the air with carbonated liquid, cutting off the supply when the receptacle is filled and sealing the same; furthermore, to provide a separate bung magazine and mechanism whereby the bungs are fed and carried to the desired position to be driven into the receptacle, all automatically and without relieving the pressure.

A still further object of the invention is the construction of a racker that will greatly facilitate the labor involved in this work and at the same time considerably reduce the expense of the same.

The invention still further consists in an apparatus as above described having a table for supporting the receptacle to be filled that is automatically adjusted and that will also automatically remove the receptacle when filled from the table.

Further objects of the invention reside in the construction of an apparatus as above described that will be comparatively simple, strong, durable, effectual in its operation, and comparatively inexpensive to manufacture.

With the above and other objects in view the invention finally consists in the novel construction, combination, and arrangement of parts to be hereinafter more specifically described, and particularly pointed out in the claims.

In describing the invention in detail reference is had to the accompanying drawings, forming a part of this specification, and wherein like figures of reference indicate similar parts throughout the several views, in which—

Figure 1 is a front perspective view of the table carrying the filling bunging mechanism. Fig. 2 is a broken vertical section through the filling-cylinder and supporting-column, also showing parts in elevation. Fig. 3 is a detail of the valve controlling the shifting table, showing operating-rod in lowermost position. Fig. 4 is a sectional detail of part of the filling means. Fig. 5 is a front elevation of the means for oscillating the sliding plate, showing the table and the rear member of the plate in section. Fig. 6 is a plan of the wearing-plate. Fig. 7 is a plan of the forward portion of the table. Fig. 8 is a section taken on the line 8 8, Fig. 10. Fig. 9 is a section of one of the valves with the operating means in elevation. Fig. 10 is a plan view of the table, showing the supporting-column in section. Fig. 11 is a plan of the sliding plate. Figs. 12 and 13 are detail views of the barrel-tipping mechanism. Fig. 14 is another sectional view of the valve shown in Fig. 9. Figs. 15 and 16 are sectional views at right angles to each other of the bung-cylinder.

Like numerals of reference refer to corresponding parts throughout the several views.

A suitable base 1 carries two standards 2 2, which are connected at their upper ends by a cross-beam 3, which supports a hollow column 4. On this hollow column is a sliding collar 6, which supports a vertically-reciprocating table 5, having rear wall 14 connected to said collar. At the upper end of the column 4 is supported an air-cylinder 7, containing a piston 8, whose rod 8ᵃ is connected to the collar 6 by means of bolts 9 9, extending through vertical slots 10 in the hollow column 4. At the lower end of this piston-rod is a supplemental piston 12, which works within a dash-pot 11 for cushioning the downstroke of the device. Table 5 is composed of two sections 5ᵃ 5ᵇ, (see Fig. 10,) bolted together by the flanges 13 13, and section 5ᵃ is perforated near the outer edge, as at 16, and fitted with a thimble or nipple 16ᵃ for connection with the bung-hole of the barrel to be filled. A gasket 17, of rubber, is provided for the purpose of securing a tight joint. Pivoted to the table 5 at about its center is a sliding plate 18, adapted to oscillate thereon, a suitable pintle 19 connecting the parts. Plate 18 is provided with two openings 20 21, which are adapted to alternately register with bung-hole 16 in table 5 as the plate 18 is oscillated. (See Fig. 8.) Above opening 20 is mounted the bung-driving mechanism 22, and above opening 21 is arranged the filling-tube mechanism 23. A bracket-plate 24 is mounted on table 5 and is perforated at 25. The wall of perforation 25 is cut away at 26 and the perforation so spaced relative to the bung-hole 16 in table 5 that when the filling-hole 21 registers with the bung-hole 16 opening 20 in the plate is arranged under perforation 25 in the bracket.

Section 5ᵃ is recessed for the reception of a segmental wearing-plate 5ᶜ, and a groove or gutter 5ᵈ surrounds the depression and receives a corresponding ridge or flange 5ᵉ on the wearing-plate 5ᶜ. (See Figs. 6, 7, and 8.) Sliding plate 18 is correspondingly recessed to receive a wearing-plate 18ᵃ, which is bored at 20ᵃ and 21ᵃ to correspond to the openings in the sliding plate. An air-cylinder 27 is provided for moving the oscillating plate 18 and is connected by piston-rod 28, bell-crank lever 29, and link 30 to the lug 31 on the rearwardly-projecting member 32 of oscillating plate 18, as shown in Fig. 5. Rod 28 is guided at 33 and is secured to lever 29 by the pin-and-slot connection 34. Table 5 is provided with an additional segmental wearing-plate 35, against which the rear member of the oscillating plate bears. The bung-driving mechanism comprises a cylinder 36, supported directly above hole 20 by standards 37 37'. Standard 37 is bent outward at 38 and downward along the edges of the oscillating plate 18 and table 5 and is provided at its lower end with a clamping-plate 39, bolted thereto and arranged to clamp against the lower surface of table 5. Standard 37' is bent outward at 38' and extends through registering segmental slots 40 41 in the plate 18 and table 5. A plate 39', bolted thereto, is similar in kind and function to plate 39. A piston 42 in cylinder 36 carries the bung-driving plunger 43. A double valve 44 is connected to cylinder 36 by pipes 46 47 for the purpose of supplying air above and below piston 42. This valve is shown in detail at Figs. 9 and 14. Chamber 48 has a nipple 49 for the connection of the air-supply pipe 50 and nipples 51 and 52 for the connection of pipes 46 and 47, respectively. In the valve-chamber 48 is arranged a double piston-valve 53 for controlling communication between the air-supply pipe 50 and pipes 46 and 47, and the chamber is provided at its upper and lower end with perforations 54 55, through which the air from either end of cylinder 36 may escape when pressure is supplied to the other end of said cylinder.

Valve-rod 56 extends through housing 57 and is provided therein with the collar 58. A spring 59, bearing against the under surface of said collar, normally keeps the valve in its upper position. The housing 57 is closed at the bottom by plate 60, which also serves as a support for the lower end of spring 59. A handle 61 for depressing the valve is pivoted to a sliding collar 62 on valve-rod 56 and is connected to plate 18 by the pivoted link 63. Below sliding collar 62 on the valve-rod is mounted a fixed collar 64, which limits the movement of collar 62. Collar 64 is cut away at 65, whereby when the valve is lowered said collar wipes the end of pawl 66, which engages with the top of collar 64 on the return movement of the valve and holds said valve in the position indicated in full lines in Fig. 14.

Pawl 66 is pivoted, together with link 63, on pin 67 and rests at its rearward end on the edge of table 5, whereby it is prevented from rising above a substantially-horizontal position. Table 5 is provided with a cam-plate 68, which is adapted to engage the rear end of lever 66 when the oscillating plate 18 is moved to the left, whereby the forward end of said pawl is depressed sufficiently to release the collar 64.

To prevent the valve from immediately rising to its upper position, valve-stem 56 projects below the level of the under surface of table 5 and is bent inward and upward at 69. It will thus be seen that when the pawl 66 releases the valve 56 the latter will rise until the end 69 is in contact with the lower surface of table 5. (See dotted lines, Fig. 14.) Plate 18 is recessed at 70 directly above the end 69 of the valve-stem, and table 5 is provided at 71 with a perforation which is adapted to register with the end of the valve-stem and recesses 70 at the same time that the bung-cylinder and bung-driving plunger are directly over the bung-hole 16. It follows from this construction that only when the bung-driving plunger is in the position to drive the bung into the barrel will the valve 44 return to its uppermost position. As has been stated, the filling mechanism is mounted directly above the hole 21 in plate 18. It comprises the filling-tube 72, which is arranged to be raised and lowered within a liquid-cylinder 73, mounted on the sliding plate 18. The liquid-cylinder is screwed into its lower head 74, which latter is integral with standards 75, rising from housing 76. A suitable stuffing-box 77 is provided in the opening in the cylinder-head through which the filling-tube passes and also in the opening 78 in the housing 76. Filling-tube 72 is provided at its upper end with a connecting-head 79, having the valve-seat 80 and socket 81, in which is screwed the actuating piston-rod 82. Intermediate the valve-seat and the socket 81 is a spider 83, whereby free communication is afforded between the interior of the liquid-cylinder and the filling-tube. A valve 84 is seated within the valve-seat and has a depending stem 85, terminating in button 86 beneath the lower end of the tube. A spring 87 normally holds the valve to its seat. As shown in Fig. 4, the lower end of the filling-tube is perforated at 89 to provide outlets for the liquid to be filled. Liquid is supplied to cylinder 73 at 90 through pipe 91, mounted on liquid-cylinder 73. Motor-cylinder 92, containing piston 93, is connected to the filling-tube 72 by piston-rod 82, referred to above. Suitable stuffing-boxes 94 95 are provided to prevent leakage at the openings in cylinders 73 and 92, through which piston-rod 82 passes. A valve 96 controls the admission of the air to the upper and lower ends of cylinder 92 through pipes 97 and 98, respectively. A flexible pipe 99, connected to pipe 50, supplies air to said valve.

Mounted on housing 76 and communicating with the interior thereof is a sight-glass 103, from which the flexible pipe 100 leads to air-pressure chamber 101, which is provided with pressure-regulator 102. (See Fig. 4.) A turning plug 105 may be provided in flexible pipe 101, as shown in Fig. 4. Within housing 76 is provided a float-valve 106, having suitable packing 107 and arranged to close the opening 108 in sight-glass 103 when the liquid, having filled the barrel, rises in the housing 76. Mounted on liquid-cylinder 73 and communicating therewith is a diaphragm-chamber 109, containing diaphragm 110, arranged to control valve 96. Said valve is of the ordinary rotary type and is provided with a handle 111, having a spiral spring 112 on the stem thereof, arranged to turn the same in the direction of the arrow shown in Fig. 1. A lever 113, pivoted at 114, is normally pressed by the spring 115 in the path of said handle to retain it against rotation. Diaphragm 110 is provided with a pin 116, adapted to engage the end 117 of lever 113. It will be evident, therefore, that when the pressure in cylinder 73 rises to such a point that it overbalances spring 115 lever 113 will be tripped to release valve-handle 111.

Mounted on the upper end of bung-cylinder 36 is a pressure-distributing cylinder 118, Fig. 1, which receives air from any suitable source through pipe 119 and distributes it to valves 44 and 96, heretofore referred to, and also to valve 120, controlling a supply of air to cylinder 7, and to valve 121, controlling the supply of air to cylinder 20. Valve 120 is of the double-cylinder type, like valve 44, (shown in Fig. 9,) and receives air from pipe 50 through pipe 122. In the upper end of valve 120 pipe 123 leads to the lower end of cylinder 7, and from the lower end of said valve the pipe 124 leads to the upper end of cylinder 7. A spring similar in all respects to spring 59 keeps the valve normally in its upper position. A handle 125 is provided to lower the valve, so that collar 126 may engage the end 127 of lever 128. Said lever is pivoted at 129 and connected at its rear end by means of link 130 to lever 131. (See Fig. 16.) The latter lever is pivoted at 132 to the lower face of cylinder 36 and projects beneath the end of sliding pin 133, which is suitably packed in the lower head of cylinder 36 and extends upward, so that it is struck by piston-head 42 at the lower end of its stroke. It will be seen from this that if the collar 126 be in engagement with end 127 and lever 128 when the piston descends it will drive pin 133 against the end of lever 131 and, through the intermediate link 130, trip valve 120 and allow it to return to its upper position. Valve 121 is connected to pipe 50 by pipe 134, whereby air is supplied to said valve, and is connected to the upper and lower end of cylinder 27 by pipes 135 and 136. A handle 137 is provided for setting said valve. Valve 121 is operated by suitable mechanism from cylinder 92. (See Figs. 1 and 2.) In the upper head of said cylinder is mounted a reciprocating pin 138, and on said cylinder-head a lever 139 is pivoted at 140 and arranged in the path of said pin. A retractile spring 141 is connected to one end of lever 139, and to the other end at 142 is connected a rod 143, which carries at its lower end a pawl 144, (shown in Fig. 3,) which is pressed by a spring 145 against a four-toothed wheel 150. Now it will be seen that when pin 136 is struck by piston 93 it will raise one end of lever 139 against the tension of spring 141 and, through the medium of rod 143 and pawl 144, cause valve 136 to make a quarter-revolution.

The operation of this part of the device will now be described. We will suppose valves 44 and 120 to be in their upper positions, filling-tube in its raised position, and the oscillating plate 18 in its position at the right. The table 5 will then be in its upper position and the bung-driving plunger 43 in its lower position. Valve 44 is first drawn down by its handle 61 until the fixed collar 64 is caught beneath the end of pawl 66. On releasing the handle counterweight 151 will cause it to return to the position shown in Fig. 9, the collar 62 being loosely mounted on the valve-stem for this purpose. Compressed air will then enter the lower end of cylinder 36 and the valve 44 through pipe 47 and the bung-driving plunger be raised. Valve 120 is then lowered by hand until collar 126 is caught and detained by lever 128. Air will then be exhausted in the bottom of cylinder 7 through pipe 123 and valve 120 and will be supplied to the top of said cylinder through the pipe 122, valve 120, and pipe 124. The table 5 is thereby lowered until gasket 17 is compressed around the bung-hole of the barrel to be filled. A filling apparatus is now to be brought over the bung-hole and registered therewith. This is accomplished by seating the valve 121 in the position shown in Fig. 3 by means of handle 137. Air will thus be supplied from reservoir 118 through pipe 50, pipe 134, valve 121, and pipe 136 to the lower end of cylinder 27 and will be exhausted from the upper end of said cylinder through pipe 135 and valve 121 to the open air. The piston in cylinder 27 will be raised and bell-crank lever 29 rocked and the rear section 32 of the sliding plate 18 moved to the right. This will throw the forward section of the sliding plate to the left and bring the bung-receiving aperture 20 in said plate under opening 25 in bracket-plate 24, and at the same time filling-hole 21 will be caused to register with the bung-hole 16 in table 5. In the course of this movement of the sliding plate pawl 66 will be carried to the left, with its rear end resting on the edge of table 5, until it comes in contact with the upward slope of cam-block 68, along which it rises. The forward end of the pawl is thereby depressed, as before explained, until collar 67 on the valve-rod 56 is released. The valve is then raised by spring 59 until the end 69 of the rod comes in contact with the under surface of table 5, as shown in dotted lines in Fig. 14. It will be noted that the position of the valve-holes to the openings in the cask is not thereby materially changed, and while the table is in this position a bung is dropped through opening 25 into aperture 26 in the sliding plate, as best shown in Fig. 8. It is now necessary to lower the filling-tube into the cask through openings 21 and 16. For this purpose valve 96 is drawn into the position shown in Fig. 1, in which the valve-handle is retained by lever 113. From supply-tube 50 air now flows through tube 99 to valve 96, thence through pipe 97 to the upper end of cylinder 92. At the same time air is exhausted from the lower end of said cylinder through pipe 98 and valve 96 to the open air. Piston 93 and filling-tube 72 are thereby lowered until button 86 on the rod of valve 84 strikes the bottom of the cask or barrel, and the valve is thereby raised against the pressure of spring 87. Beer or other liquid to be racked will now flow through pipe 91 at the lower end of the liquid-cylinder 73 at 152 and through the filling-tube down out of the openings at the bottom thereof into the barrel. The air contained in the barrel will now escape through openings 16 and 20, housing 76, sight-glass 103, and pipe 100 into pressure-chamber 101, from which it will escape through valve 102 after the desired pressure is reached. When the cask is full, the beer will rise through the openings 16 and 20 into the housing 76 and raise the float 106 thereof to close opening 108. Up to this time it is apparent the pressure of the beer and gas in the filling-cylinder will depend on the point of pressure at which valve 102 is set. Now, however, this avenue of escape having been cut off, the pressure in the cask and in the liquid-cylinder will rapidly rise until it reaches approximately the pressure under which the beer is let into the filling-machine. This pressure, or, indeed, a somewhat-less pressure, acting on the diaphragm 110, (see Fig. 2,) will press the same outward and overcome the resistance of spring 115, will trip lever 113, and cause it to release handle 111. Valve 96 will then be turned by spring 112 until it comes into contact with stop 153. It will then be noted that the upper end of cylinder 92 will be opened to the exhaust of said valve through pipe 97, and the lower end of said cylinder will be dropped into communication with the supply of compressed air through pipe 98, the passage in said valve, pipe 99, and pipe 50. Piston 93 will therefore rise and withdraw the filling-tube from the barrel. As piston 93 reaches the upper end of its stroke it strikes pin 138, raises end of lever 139 against the tension of spring 141, and thereby depresses rod 143, which causes plate 150 to make a quarter-revolution, as heretofore explained. This allows the air to exhaust from the lower side of cylinder 27 and brings the upper side of said cylinder, through pipe 135 of said valve, pipe 134, and pipe 150, into communication with the compressed-air supply. The piston in cylinder 27 is thereby lowered, and through piston-rod 28, bell-crank lever 29, and link 30 the oscillating plate is again oscillated, the rear portion moving to the left and the upward portion consequently moving to the right. During this operation it will be observed that the bung-driving plunger has remained in its elevated position for the reason that its controlling-valve has not yet been released. End 69 of the valve-rod now slides along the under surface of table 5 as plate 18 moves to the right until it reaches aperture 71 in table 5. This happens at identically the moment when the bung-plunger comes into alinement with the bung-hole 16. The openings 71 and recesses 70 are of a size to allow end 69 of the valve-rod to enter them readily. Valve 44 will therefore be raised by spring 59 when the rod reaches this opening, and the supply of air will be cut off from the lower face of piston 42 and supplied to the upper face of said piston. The bung-driving plunger is forced outward thereby and strikes the bung contained in opening 20 and drives it through opening 16 into the bung-hole of the barrel. As the bung-driving plunger reaches the bottom of its stroke it strikes pin 133 and through the levers 131 and link 130 releases lever 128 from collar 126 on the rod of valve 120. This valve is then raised by its spring and the supply of air thereby cut off from the top of cylinder 7 and supplied through the bottom of said cylinder. The exhaust of air from the top of cylinder 7 takes place exactly as heretofore described in relation to cylinder 36. The piston 8 now raises table 5 and the filling-machine is in its original position and ready to fill and bung another barrel.

In order that when the barrel is filled it may be thrown off from the machine automatically, I have provided the mechanism shown in the lower part of Fig. 2 and in Figs. 12 and 13. 155 is a rod formed at its upper end into a slotted plate 156, through the slot of which extends the bolts 9. Suitable nuts 157 (see Fig. 10) are used to clamp the plate at various positions with reference to the bolts. At its elevation rod 155 is connected to lever 158 by pin-and-slot connection 159. (See Fig. 12.) Lever 158 is pivoted at 160 and arranged to strike against tappet 161 on lever 162. This tappet is pivoted to lever 162 at 163 and weighted at 164 for purposes which will appear. Lever 162 is fixed to rotary shaft 165, mounted in base 1 at 166 and 167. On shaft 165 are mounted two curved arms 168, adapted to be operated thereby. A slotted plate is secured to bolts 9 at points which are determined by the point at which it is desired to roll the barrel from platform 70. When properly seated, the rod 155 will rise with the table 5, with which it is connected, as set forth, and end 170 of lever 158 will be depressed. When it reaches a horizontal position, it will strike tappet 164 and lower arm 162, and thereby raise arms 168, which will strike against the lower part of the barrel and tip it off platform 170. It will be noted that as rod 155 descends and 170 in lever 158 is raised it will strike tappet 161 to be revolved on pivot 163 and allow lever 158 to pass. After the end of said lever is clear weighted handle 164 will cause the tappet to again drop into the position shown in Fig. 12, ready to be again actuated by the lever. The entire machine is now ready for the reception of another barrel to be filled.

Having fully described my invention, what I claim as new, and desire to secure by Letters Patent, is—

1. In a barrel-filling mechanism, the combination of a filling-tube, a pipe connecting the same with a suitable source of beer under pressure, a passage for the escape of air from the barrel, means operated by the overflow of the beer to close the escape-passage, a fluid-cylinder, a piston therein connected to the filling-tube for raising and lowering the same, a valve controlling the admission of the fluid to said cylinder and means operated by the pressure of the beer for controlling the valve, whereby when the barrel is filled the filling-tube is automatically withdrawn.

2. In a barrel-filling device, the combination of a plate provided with means for effecting a tight joint with the bung-hole of the barrel when filled, the housing mounted on the plate, an air-escape connecting with the housing, a float-valve arranged in the housing to close the air-escape, a filling-tube arranged to reciprocate through the housing, a pipe arranged to supply beer to the filling-tube, a fluid-cylinder arranged to raise and lower the filling-tube, a valve for controlling the supply of the motive fluid to and from said cylinder, means operated by the pressure of beer in the filling device to operate said valve to raise the filling-tube when the barrel is full.

3. The combination in a barrel-filling machine, of a housing, an air-escape leading from said housing, a float-valve arranged to close the air-escape, means for securing a sealed joint between the housing and the barrel to be filled, a filling-tube arranged to reciprocate through said housing, a supply-cylinder surrounding the upper end of the filling-tube, a motor-cylinder connected to the filling-tube to raise and lower the same, a valve arranged to control the supply of motive fluid to the cylinder, a chamber communicating with the supply-cylinder and containing a diaphragm to be operated by the pressure in said cylinder and intermediate mechanism whereby the valve is tripped by the movement of the diaphragm to supply fluid to the motor-cylinder to raise the filling-tube when the barrel is filled.

4. In a barrel-filling machine, a table having a hole arranged to form a tight joint with the bung-hole of the barrel, a plate arranged to oscillate on the table and provided with openings adapted to register alternately with the opening in said table, a fluid-cylinder arranged to oscillate the plate, a filling-tube arranged over one of the openings in the sliding plate, a fluid-cylinder for raising and lowering the filling-tube, means for driving a bung from the second of the said openings into the barrel, a fluid-cylinder for operating said bung-driving means, valves controlling the supply of pressure to the fluid-cylinders and means operated by the level of the beer to automatically actuate said valves whereby when the barrel is full the filling-tube will be withdrawn, the sliding plate shifted and the bung driven home.

5. In a barrel-filling machine the combination of a suitable support, a table mounted to reciprocate vertically on said support, and having an opening adapted to register with the bung-hole of a barrel, a sliding plate mounted on the table and adapted to oscillate thereon and provided with a filling-opening and a bung-receiving opening, means including a fluid-cylinder for operating the same, a filling-tube mounted to reciprocate through the filling-opening, a fluid-cylinder connected thereto to operate the same, valves arranged to control the supply of fluid to the various cylinders and means operated by the pressure of the liquid to be filled to automatically actuate said valves whereby the filling-tube will be raised from the barrel, the sliding plate caused to oscillate, the bung-driver actuated and the table raised.

6. In a filling-machine, the combination of a table having an opening adapted to register with the bung-hole of a barrel, filling and bunging means mounted on the table, a vertical standard on which the table is mounted to slide vertically, a platform adapted to receive the barrels, pivoted arms arranged to thrust the barrel from the platform, and connections between the pivoted arms and the vertically-movable table, whereby the arms may be oscillated.

7. In a racker for carbonated liquids, a frame carrying an adjustable vertically-operating table provided with a sealing device, a filling-tube, a bung-driver, valves operating pistons secured to said filling-tube and bung-driver, means for operating said valves, an adjustable package-support carried by the frame, and means whereby the support is automatically tilted to throw the package off, substantially as shown and described.

8. In a racking device, a liquid-cylinder connected to a liquid-supply and provided with a sealing device, an air-cylinder, a filling-tube operating in said liquid-cylinder and normally closed thereto and provided with a valve, a piston connected to the filling-tube and operating in the air-cylinder and operating a rod pivotally secured to a valve to admit air to a cylinder carrying a piston operating the sealing device, substantially as shown and described.

9. In a racker, a liquid-cylinder, an air-cylinder, a filling-tube operating in said liquid-cylinder and normally closed thereto, a piston in the air-cylinder to operate the filling-tube, said liquid-cylinder being suitably connected at its base to a shifting plate provided with apertures and arranged to slide on a table likewise provided with an aperture adapted to register with the apertures in said plate, substantially as shown and described.

10. In a racker, an adjustable vertically-operated table having suitably supported thereon a liquid-cylinder connected to a liquid-supply, and carrying a filling-tube normally closed thereto, a piston-rod engaging said filling-tube and operated by the piston-head carried by an air-chamber and extending through a stuffing-box, substantially as shown and described.

11. In a racker, a table with a hole arranged to be brought into register with the bung-hole of a barrel, a bung-adjusting block arranged above the table and having an aperture therein with an inclined face, a shifting plate arranged on the table and having a hole adapted to register alternately with the hole in the table and with that in the adjusting-block, whereby the bung is transferred from the adjusting-block to a position over the bung-hole, and a plunger to drive the bung mounted over the shifting table, substantially as shown and described.

12. In a racker, the combination of the liquid-cylinder, a filling-tube normally closed thereto and operating in said liquid-cylinder, said filling-tube being provided with a rod carrying a button on its lower extremity, a chamber carried by the shifting plate, and provided with a float-valve, a sealing device formed by the contact of the table and shifting plate, a bung-adjusting device for inserting the bung, an air-cylinder for operating the sealing device, an air-cylinder for operating the filling-tube, and an air-reservoir, valves admitting air into said cylinders, and means for automatically operating said valves, substantially as shown and described.

13. In a racker, a filling-table having a bunging-opening, a plate pivoted to the table and having two openings adapted to register with the bunging-opening, and filling and bunging means mounted above said openings, substantially as shown and described.

14. In a racker, a liquid-cylinder, a filling-tube operating in said liquid-cylinder and normally closed thereto a valve carried by said filling-tube adapted to be opened when the tube comes in contact with the bottom of the package, substantially as shown and described.

15. In a racker a filling-tube, an air-motor operating the same, a valve controlling said motor, a float-valve to automatically close the air-passage from the barrel and stop the flow of liquid a chamber communicating with the chamber carrying said float-valve, said chamber provided with a diaphragm operating a rod to automatically operate said air-valve, substantially as shown and described.

16. In a racker, a sealing device having an air-passage, a filling-tube, an air-cylinder and piston arranged to reciprocate the filling-tube, a valve adapted to control the flow of air to the cylinder, and a float-valve in said air-passage arranged to automatically close the same, a chamber communicating with said air-passage provided with a diaphragm, operating a rod adapted to automatically operate the air-valve, substantially as shown and described.

17. In a racker, a vertically-operated table, a sliding sealing-plate pivotally secured to said table, a liquid-cylinder and bunging device carried by said plate, a filling-tube operating in said liquid-cylinder, an air-cylinder carrying a piston adapted to operate said filling-tube, said bunging device provided with a bung-driver, an air-cylinder carrying a piston operating said bung-driver, valves carried by said air-cylinder to admit air to said cylinders whereby the filling-tube and bung-driver are operated, substantially as shown and described.

18. In a racker device, a liquid-cylinder, a filling-tube operating in said cylinder, an air-cylinder, a piston operating in said air-cylinder and secured to said filling-tube, substantially as shown and described.

19. In a filling-machine, a combination of the filling-tube adapted to enter the receptacle, an air-cylinder, and a piston therein secured to said filling-tube and adapted to operate same, substantially as shown and described.

20. In a filling-machine, the combination of a reciprocating table, an air-cylinder, a piston therein secured to said table an air-operated filling-tube mounted on said table, substantially as shown and described.

21. In a racker, a tilting table for carrying the package, a vertically-reciprocating filler-table for tilting the package-table to remove the package, substantially as shown and described.

22. In a racker, a filling device and a bunging device to alternately come in vertical alinement with the opening in the receptacle, means for automatically withdrawing the filling device from the receptacle, and means for automatically driving the bung, substantially as shown and described.

23. In a filling-machine, a combination of a filling-tube adapted to enter the receptacle, a stuffing-box, said filling-tube being adapted to reciprocate through said stuffing-box, an air-cylinder, and a piston therein, said piston being secured to said filling-tube, substantially as shown and described.

24. In a racking device, a liquid-cylinder, a filling-tube operating in said liquid-cylinder, an air-cylinder, a piston operating in said air-cylinder and secured to said filling-tube to operate the same, substantially as shown and described.

25. In a racking device, a liquid-cylinder, a filling-tube operating in said cylinder, an air-cylinder, a piston operating in said air-cylinder and connected to said filling-tube to operate the same, substantially as shown and described.

26. In a racker for carbonated liquids, a frame carrying an adjustable vertically-operated table provided with a sealing device, a filling-tube, a bung-driver, valves admitting air into cylinders carrying pistons secured to said filling-tube and bung-driver, and means for operating said valve, substantially as shown and described.

27. In a racker, an adjustable vertically-operated table having suitably supported thereon a cylinder carrying a filling-tube, an air-cylinder, a piston, connections between the piston and the filling-tube whereby the filling-tube is reciprocated, substantially as shown and described.

28. In a racker, a tilting table for carrying the package, a vertically-reciprocating filler-table and means operated by the ascent of the filler-table to tilt the package-table to remove the package, substantially as shown and described.

29. In a filling-machine, the combination of a reciprocating table, an air-cylinder, a piston therein and secured to said table, and an air-operated bung-driver mounted on said table, substantially as shown and described.

30. In a racking device, a liquid-cylinder, an air-cylinder, a filling-tube operating in said liquid-cylinder and normally closed thereto, and provided with a valve, a piston-rod secured to said filling-tube and operating in said air-cylinder, and means for operating the sealing device, substantially as shown and described.

31. In a racker as described, a liquid-cylinder, a filling-tube operating therein, an air-cylinder, a piston secured to the filling-tube and operating an arm arranged on the top of the air-cylinder whereby a valve controlling a piston secured to the shifting table is automatically operated, substantially as shown and described.

32. In a racker, an adjustable vertically-operated table having a liquid-cylinder suitably mounted thereon, a filling-tube operating in said cylinder, a piston-rod engaging said filling-tube and operated by a piston-head in an air-cylinder carried by the liquid-cylinder, substantially as shown and described.

33. In a filling-machine, a filling-tube arranged to reciprocate through said filling-head, a fluid-motor connected to the filling-tube to operate the same, a valve controlling the supply of fluid to said motor, and means operated by the level of the liquid to shift the valve to raise the filling-tube, substantially as shown and described.

34. In a racker for carbonated liquids, a frame carrying an adjustable vertically-operated table provided with a sealing device, a filling-tube, a bung-driver, valves for operating said filling-tube and bung-driver, a universal package-support carried by the frame, and means whereby the support is automatically tilted to throw the package off, substantially as shown and described.

35. In a racker, an adjustable vertically-operated table having a liquid-cylinder suitably mounted thereon, a filling-tube operating in said cylinder, a piston-rod engaging said filling-tube and operated by a piston-head carried by an air-cylinder, substantially as shown and described.

36. In a racker for carbonated liquids, a frame, a vertically-operated table supported by said frame, a sealing carrier or plate, pivotally secured to the table, a bunging device and filling-tube mounted on said sealing carrier or plate, air-cylinders, pistons operating in said cylinders for operating the bunging device and filling-tube, valves admitting air to said cylinders whereby the bunging device and filling-tube are operated, substantially as shown and described.

37. In a filling-machine, a filling-head, a filling-tube arranged to reciprocate through said filling-head, a fluid-motor connected to the filling-tube to operate the same, a valve controlling the supply of fluid to said motor, and means adapted to be automatically operated when the barrel is filled to shift the valve to raise the filling-tube, substantially as shown and described.

38. In a racker for carbonated liquids, a frame carrying an adjustable vertically-operated table provided with a sealing device, a filling-tube, a bung-driver, valves for operating said filling-tube and bung-driver, a package-support carried by the frame, and means whereby the package is automatically tilted off, substantially as shown and described.

39. In a racker for carbonated liquids, a frame, a vertically-operated table supported by said frame, a sealing carrier or plate pivotally secured to the table, a bunging device and filling-tube mounted on said sealing carrier or plate, air-cylinders, pistons operating in said cylinders for operating the bunging device and filling-tube, valves carried by said cylinders to effect the movement of the parts, substantially as shown and described.

40. In a filling-machine, a suitable support, a horizontally-reciprocating carrier, a filling-tube and bung-driver, and means controlled by the movement of the reciprocating carrier to cause a motor to operate the bung-driver when it is brought in alinement with the bung-hole of the package, substantially as shown and described.

41. In a liquid-filling machine for breweries or the like, the combination of a support having a guide-opening to fit closely about the filling-opening of a positioned package to be filled, an oscillating plate on said support, a vertically-reciprocatory filling-tube and a vertically-reciprocatory stopper-driver mounted on said plate, a source of fluid-pressure, and means for controlling the pressure whereby the driver is automatically moved to follow the tube in alinement with said guide-opening and driven, substantially as shown and described.

42. In a liquid-filling machine for breweries or the like, the combination with a source of fluid-pressure, of a support having a guide-opening with which the filling-opening of a positioned package to be filled registers, an oscillating plate pivoted on said support, a filling-tube and a bung-driver mounted on said plate, and means for controlling said pressure to automatically move the plate on the support to bring the said bung-driver in alinement with the said guide-opening and to automatically drive the bung-driver through said guide-opening, substantially as shown and described.

43. In a liquid-filling machine for breweries or the like, the combination with a source of fluid-pressure, of a support, a table on the support, a vertically-reciprocatory filling-tube and a vertically-reciprocatory stopper-driver on the table, a cylinder and a piston therein operatively connected with the said driver, and means for controlling said pressure whereby the table is automatically moved to bring the driver in alinement with the opening of a positioned package, and a piston to automatically drive the stopper-driver, substantially as shown and described.

44. In a liquid-filling machine for breweries or the like, the combination with a source of fluid-pressure of a support, a table on the support, a vertically-reciprocatory stopper-driver on the carrier, a cylinder and a piston therein operatively connected with the said filling-tube and means for controlling the pressure to move the said tube and driver in alinement with the filling-opening of a positioned package, and for automatically moving the said piston to withdraw the filling-tube, substantially as shown and described.

45. In a filling-machine, a suitable support, a horizontally-movable carrier, a filling-tube and a bung-driver plunger mounted thereon and arranged to be brought successively into alinement with the bung-hole of a package, a motor for reciprocating the bunging-plunger, and means controlled by the movement of the carrier to cause the motor to drive the plunger when the latter is brought into alinement with the bung-hole of the package, substantially as shown and described.

46. In a filling-machine for liquids, the combination with a holder for positioning the package to be filled, of a carrier above the holder, a vertically-reciprocatory filling-tube and a vertically-reciprocatory stopper-driver on the carrier, the carrier being movable to bring the said tube and driver alternately into alinement with the filling-opening of a positioned package, a piston reciprocatory under fluid-pressure and operatively connected with the said driver, a valve movable to direct the fluid-pressure alternately against opposite sides of the piston, mechanism upon the carrier operatively connected with said valve to shift the same, and means in the path of said mechanism operating through the latter to shift the said valve and produce driving plunge of the driver when the said carrier is moved to bring the driver into alinement with the package-opening, substantially as shown and described.

In testimony whereof I affix my signature in presence of two witnesses.

RICHARD H. GANGWISCH.

Witnesses:
H. C. EVERT,
JNO. M. IRWIN, Jr.